United States Patent
Roy et al.

(10) Patent No.: US 9,535,187 B2
(45) Date of Patent: *Jan. 3, 2017

(54) DEVICE AND METHOD TO DETERMINE CONDUCTIVITY FOR HIGH PRESSURE-HIGH TEMPERATURE SERVICE

(75) Inventors: Indranil Roy, Sugar Land, TX (US); Oliver C. Mullins, Ridgefield, CT (US); Richard E. Lewis, Edmond, OK (US); Colin Longfield, Sugar Land, TX (US); Chris Wilkinson, Houston, TX (US); Paul George, Sugar Land, TX (US); Rashmi Bhavsar, Houston, TX (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 91 days.

This patent is subject to a terminal disclaimer.

(21) Appl. No.: 13/225,298

(22) Filed: Sep. 2, 2011

(65) Prior Publication Data

US 2012/0059636 A1    Mar. 8, 2012

Related U.S. Application Data (60) Provisional application No. 61/379,520, filed on Sep. 2, 2010, provisional application No. 61/379,495, filed on Sep. 2, 2010, provisional application No. 61/379,582, filed on Sep. 2, 2010, provisional application No. 61/384,429, filed on Sep. 20, 2010.

(51) Int. Cl.
*G06F 7/60* (2006.01)
*G01V 11/00* (2006.01)

(52) U.S. Cl.
CPC .................... *G01V 11/00* (2013.01)

(58) Field of Classification Search
CPC ........ G01V 3/38; G01V 3/20; G01N 33/2823; G01N 1/12; E21B 49/08; E21B 49/00; E21B 47/10; C08G 18/0823; C08G 18/289
USPC ................................ 703/2, 12, 22
See application file for complete search history.

(56) References Cited

U.S. PATENT DOCUMENTS

| | | | | |
|---|---|---|---|---|
| 5,309,995 A | * | 5/1994 | Gonzalez et al. | 166/284 |
| 7,249,009 B2 | | 7/2007 | Ferworn et al. | |
| 7,857,047 B2 | * | 12/2010 | Remmert et al. | 166/250.01 |
| 8,271,248 B2 | * | 9/2012 | Pomerantz et al. | 703/10 |
| 2004/0104341 A1 | * | 6/2004 | Betancourt | E21B 47/10 250/255 |

(Continued)

OTHER PUBLICATIONS

Moller et al. ("Models of Geothermal Brine Chemistry", University of California, San Diego, January Jun. 30, 1993-Mar. 17, 1999).*

(Continued)

*Primary Examiner* — Omar Fernandez Rivas
*Assistant Examiner* — Iftekhar Khan
(74) *Attorney, Agent, or Firm* — John Vereb (57) ABSTRACT

A method for characterizing one or more properties of a geological formation including brine, the method including inputting at least one first property of the geological formation into an equation of state (EOS) model, the EOS model accounting for a high temperature effect on the brine; solving the EOS model to determine at least one second property of the geological formation; and outputting the at least one second property to a display device.

19 Claims, 5 Drawing Sheets

(56) References Cited

U.S. PATENT DOCUMENTS

| | | | |
|---|---|---|---|
| 2005/0065759 A1* | 3/2005 | Barroux | E21B 4/04 703/10 |
| 2007/0119244 A1* | 5/2007 | Goodwin | E21B 47/10 73/152.28 |
| 2009/0192768 A1 | 7/2009 | Zuo et al. | |
| 2009/0235731 A1 | 9/2009 | Zuo et al. | |
| 2009/0250264 A1* | 10/2009 | Dupriest | E21B 7/00 175/40 |
| 2011/0088895 A1* | 4/2011 | Pop | E21B 7/04 166/254.2 |
| 2011/0246143 A1* | 10/2011 | Pomerantz | E21B 49/00 703/2 |
| 2012/0055668 A1* | 3/2012 | Wu | C08G 18/0823 166/250.01 |
| 2013/0312481 A1* | 11/2013 | Pelletier | G01V 11/00 73/1.02 |

OTHER PUBLICATIONS

Ussher et al. ("Understanding the resistivities observed in geothermal systems", 2000, Proceedings World Geothermal Congress).*

Yousheng et al. ("Conductivity of NaCl solution at 0.4-5.0 GPa and 25-500 C", 1997, National Natural Science Foundation of China).*

Maldonado et al. (Ultra-deep HP/HT Completions: Classification, Design Methodologies, and Technical Challenges, 2006, Offshore Technology Conference).*

Paula Jr. et al.("HPHT Drilling—New Frontiers for Well Safety",SPE/IADC 119909, 2009,pp. 1-12).*

Maldonado et al.("Ultradeep HP/HT Completions: Classification, Design Methodologies, and Technical Challenges",OTC 17927,2006, pp. 1-16).*

International Search Report and Written Opinion of PCT Application No. PCT/US2011/05437 dated Mar. 19, 2012.

Ucok, H., Ershaghi, I. and Olhoeft, G. R., Resistivity of Brine Saturated Rock Samples at Elevated Temperatures, U.S. Geological Survey and L. L. Handy, USC, Stanford Geothermal Workshop, 1979.

Ucok, H., Ph.D. "Temperature Dependence of the Electrical Resistivity of Aqueous Salt Solutions and Solution Saturated Porous Rocks", Dissertation, University of Southern California, (1979), pp. 1-169.

Ucok, H., Ershaghi, I. and Olhoeft, G. R.,"Electrical Resistivity of Geothermal Brines", presented at the Proc. SPE International Symposium on Oilfield and Geothermal Chemistry, Houston, Texas (1979), pp. 163-172. Also, published in the Apr. 1980 issue of the Journal of Petroleum Technology. pp. 717-727.

Quid, Arvin S. and Marshall, William L., "Electrical Conductances of Aqueous Sodium Chloride Solutions from 0 to 800 degrees C and at Pressures to 4000 Bars", The Journal of Physical Chemistry, 1967, pp. 684.

* cited by examiner

DEVICE AND METHOD TO DETERMINE CONDUCTIVITY FOR HIGH PRESSURE-HIGH TEMPERATURE SERVICE

RELATED APPLICATIONS

This application, pursuant to 35 U.S.C. §119(e), claims priority to U.S. Provisional Application Ser. Nos. 61/379,520, 61/379,495, 61/379,582 that are each filed on Sep. 2, 2010 and 61/384,429 which was filed Sep. 20, 2010. Each of these applications is herein incorporated by reference in its entirety.

BACKGROUND

In accordance with known interpretation techniques, one or more types of porosity-related measurements is combined with measurements of electrical resistivity, or its inverse, electrical conductivity, to infer the character of the fluid content within the pore spaces of a geological formation. Assuming the porous rock matrix is non-conductive, it has been theorized the electrical properties depend only upon the brine or connate water contained in the pores of the rock and the geometry of the pores. The conductivity of a fluid-saturated rock is due to the ions of the dissolved salt that make up the brine and the magnitude of the electrical conductivity has been presumed to be primarily a function of the brine content of the reservoir fluid. Pioneer work in the field was performed by G. E. Archie as set forth in his paper "The Electrical Resistivity Log As An Aid In Determining Some Reservoir Characteristics", Trans. AIME, v. 146, 1942, PP. 54-62.

As is known in the art, the value of the resistivity of a rock which is completely saturated with brine of a given concentration at a specific temperature was defined by Archie as follows:

$$F = R_o/R_w = \Phi^{-m}$$

where F is the formation resistivity factor; $R_o$ is the resistivity of rock 100 percent saturated with brine expressed in ohm-meters; $R_w$, is resistivity of brine expressed in ohm-meters; $\Phi$ is the porosity and m is an empirical constant. Resistivities of oil field brines have been investigated and values published for a small range of relatively low temperatures historically encountered during drilling.

Current modeling techniques utilize this information in algorithms to relate the water conductivity to brine salinity, and to use this information to infer the amount of brine present in the reservoir fluid, and thus the hydrocarbon content of the reservoir.

SUMMARY

In one aspect, embodiments disclosed herein relate to

A method for characterizing one or more properties of a geological formation including brine, the method including inputting at least one first property of the geological formation into an equation of state (EOS) model, the EOS model accounting for a high temperature effect on the brine; solving the EOS model to determine at least one second property of the geological formation; and outputting the at least one second property to a display device.

This summary is provided to introduce a selection of concepts that are further described below in the detailed description. This summary is not intended to identify key or essential features of the claimed subject matter, nor is it intended to be used as an aid in limiting the scope of the claimed subject matter. Other aspects and advantages of the invention will be apparent from the following description and the appended claims.

DETAILED DESCRIPTION

It has now been discovered that reservoir fluids may depart significantly from ideal behavior, especially at the higher temperatures and pressures that are being encountered as deeper wells are being drilled. Thus, previous modeling and simulation techniques may mischaracterize reservoirs and fluids contained therein. Embodiments disclosed herein relate to reservoir characterization techniques developed with the newly discovered phenomena that extreme downhole conditions significantly affect the properties of reservoir fluids. More specifically, embodiments disclosed herein relate to reservoir characterization techniques accounting for a high temperature effect on the brine, a pressure effect or high pressure effect on the brine, different ions dissolves in gasses, or a combination thereof. Reservoir characterization techniques for embodiments disclosed herein may include modeling or simulation of a reservoir, reservoir fluid, or phase of a reservoir fluid based on known component data (e.g., molecular weights and other physical or chemical properties), as well as data stored or input based on laboratory measurements, downhole measurements, research data presented in publications, well logs, or other relevant data sources as may be known or recognizable to one skilled in the art.

As used herein, "high temperature effect" is defined as deviation(s) from ideal behavior of a reservoir, reservoir fluid, or a phase of a reservoir fluid, at elevated temperatures, such as greater than 300° F., 350° F., 400° F., 450° F., 500° F. or greater in various embodiments. As used herein, "pressure effect" is defined as the influence pressure may have on the behavior of a reservoir, reservoir fluid, or phase of a reservoir fluid. As used herein, "high pressure effect" is defined as deviation(s) from ideal behavior of a reservoir, reservoir fluid, or a phase of a reservoir fluid, at elevated pressures, such as greater than 15 ksi, 20 ksi, 25 ksi, 30 ksi or greater in various embodiments. Models or algorithms used to estimate or predict the character of a reservoir, reservoir fluid, or phase of a reservoir fluid in embodiments disclosed herein thus include functions or derivations to more accurately calculate or estimate one or more properties of the reservoir, reservoir fluid, or phase of a reservoir fluid accounting for one or more of these effects.

Thermodynamic models have now been developed that account for the high temperature effects on properties of the brine, including the non-ideal behavior discovered at extreme downhole conditions. Functions, algorithms, or derivations used to account for the high temperature effects on the brine that may be included in embodiments of the thermodynamic model may account for changes in one or more of molecular interactions, solubility constants or solubility characteristics of water (solvating power), di-electric constant, density, electronegativity, dipole moment, heat capacity, hydrogen bonding, miscibility, as well as electrophoretic/relaxation effects and ion pairings, among others, as a function of temperature, including deviations from ideal behavior that may be estimated, measured, or observed at elevated downhole temperatures.

Embodiments of the thermodynamic model may also account for the effect of pressure on the brine, and thus on the geological formation and the character of the reservoir fluid. Heretofore the effect of pressure on conductivity/resistivity or various other properties of a downhole fluid has not been accounted for in efforts to determine the character of a reservoir. Thermodynamic models according to embodiments disclosed herein may include functions or derivations to account for the effect of pressure on the brine. Such functions or derivations, in some embodiments, may also account for deviations from ideal behavior at elevated pressures (the high pressure effect). Functions, algorithms, or derivations used to account for the pressure effects and high pressure effects on the brine that may be included in embodiments of the thermodynamic model may account for changes in one or more of molecular interactions, solubility constants or solubility characteristics of water (solvating power), density, di-electric constants, electronegativity, dipole moment, heat capacity, hydrogen bonding, miscibility, as well as electrophoretic/relaxation effects and ion pairings, among other properties of the brine, as a function of temperature, including deviations from ideal behavior that may be estimated, measured, or observed at elevated downhole pressures.

For example, the pressure effect on solubility of a salt in water may be represented by the following equation:

$$\left(\frac{\delta \ln N_i}{\delta P}\right)_T = -\frac{(V_{i,aq} - V_{i,cr})}{RT}$$

where the index i iterates the components, $N_i$ is the mole fraction of the $i^{th}$ component in the solution, P is the pressure, the index T refers to constant temperature, $V_{i,aq}$ is the partial molar volume of the $i^{th}$ component in the solution, $V_{i,cr}$ is the partial molar volume of the $i^{th}$ component in the dissolving solid, and R is the universal gas constant.

With respect to ion pairing and other effects that may be accounted for in the model, embodiments of the model used to determine or estimate the character of a reservoir may also include functionalities relative to numerous dissolved salts or ions. Heretofore, conductivity/resistivity algorithms were based on sodium chloride dissolved in the aqueous phase. However, brines found in reservoirs around the world may contain other ions or mixtures of ions, such as sodium-, magnesium-, calcium-, potassium-, barium-, and strontium-chlorides, bromides, borates, bicarbonates, and sulfates, among other salts that may be present in underground reservoirs as may be known to those of ordinary skill in the art. Embodiments of the model used to characterize a reservoir may thus account for differences in conductivity/resistivity that may occur based on the ions present in the brine, as well as the high temperature effects, pressure effects, and/or high pressure effects on the ions and the brine.

Reservoir fluids are known to those of ordinary skill in the art to contain various phases and components. For example, reservoirs may include an aqueous phase (e.g., water and dissolved salts), a hydrocarbon gas phase (e.g., methane, ethane, ethylene, and other light hydrocarbons), and a liquid hydrocarbon phase (e.g., pentanes, hexanes, etc., which may include heavy hydrocarbons, such as asphaltenes), as well as carbon dioxide, hydrogen sulfide, among numerous other compounds. Thermodynamic models used in embodiments herein may rely on a database of stored properties for one or more of these components, which may include one or more of molecular formula, molar weight, as well as pressure-volume-temperature data (such as one or more of phase envelopes, boiling points, melting points, density, viscosity, solubility, etc.).

Petroleum samples are often classified into fluid types that include black oils, volatile oils, retrograde condensates, wet gases, and dry gases. These fluid types may be distinguished based on carbon number, for example, and often require different considerations for their exploitation. Models used in embodiments for reservoir characterization disclosed herein may rely on a database of stored properties or averaged properties for one or more of these compound groups, which may include one or more of weight percentage, molar weight, molar percentage, carbon number range, as well as pressure-volume-temperature data (such as one or more of phase envelopes, boiling ranges, melting ranges, API gravity, formation volume factor, compressibility factor, density, viscosity, solubility, etc.).

In embodiments, at least one property of the brine may be derived from the stored data and one or more empirical relationships may be derived from an analysis of the pressure-volume-temperature data. Empirical relations are derived from an analysis of the stored properties for the compounds and/or groups of compounds (e.g., regression analyses or other numerical methods). For derivation of the empirical relation, it is generally preferred to use transforms having smooth and continuous first and second derivatives for algorithmic estimation of properties. Accordingly, the high temperature effect and/or high pressure effect may be accounted for in the model by use of one, two, three, or more transforms encompassing the overall temperature ranges and/or pressure ranges experienced during drilling and production of reservoirs. In some embodiments, for example, the high temperature effect may be accounted for based on an additive function (i.e., property=f(temperature)+f(high temperature effect)). In other embodiments or for other empirical relations, the high temperature effect may be accounted for by delineation of the algorithm over discrete temperature intervals (i.e., if x<T≤y, property=f(T), if y<T≤z, property=f' (T), etc.). In yet other embodiments, various "constants" used for calculating properties of compounds or interactions between compounds or groups of compounds, such as binary interaction parameters, may be input as a function of temperature or may be input as a constant having different values for discrete temperature ranges. Similar considerations may be used for the pressure effect and high pressure effect.

In addition to the empirical relations derivable from the stored data, the property(ies) and empirical relationships can be used to generate an Equation of State model for predicting one or more properties of the reservoir, the reservoir fluid, or a phase of the reservoir fluid, where the equation of state model may incorporate, may be tuned, or may be modified to incorporate the high temperature, pressure, and/or high pressure effects as recognizable or derived in the empirical relations. As used herein, an Equation of State model capturing the high temperature effect includes one or more equations to calculate chemical and/or physical properties of a system. The equations of the Equation of State model may include the above-derived empirical relationships, may be equations based on the above-derived empirical relationships, and may also include various equations from various Equations of State known to those of skill in the art. Examples of Equations of State that may be used, tuned, and/or modified may include the Sen-Goode-Sibbit EOS, the Redlich-Kwong EOS, the Soave-Redlich-Kwong EOS, Peng Robinson EOS, and others known to one of ordinary skill in the art. The properties of the brine that may be predicted using an Equation of State model may include conductivity, resistivity, density, viscosity, compressibility, composition (e.g., dissolved hydrocarbon content, salinity/ion concentration, ion/salt type(s), etc.), aqueous phase activity, pH, free energy, heat capacity, entropy, enthalpy, chemical potentials, and diffusion coefficients, among others. The equations of the Equation of State model may also be used to estimate properties of the reservoir fluid, such as brine content, hydrocarbon content, hydrocarbon gas content, and various phase equilibriums (VLLE, LLE, VLE, SVLLE, etc.).

Figure 1:
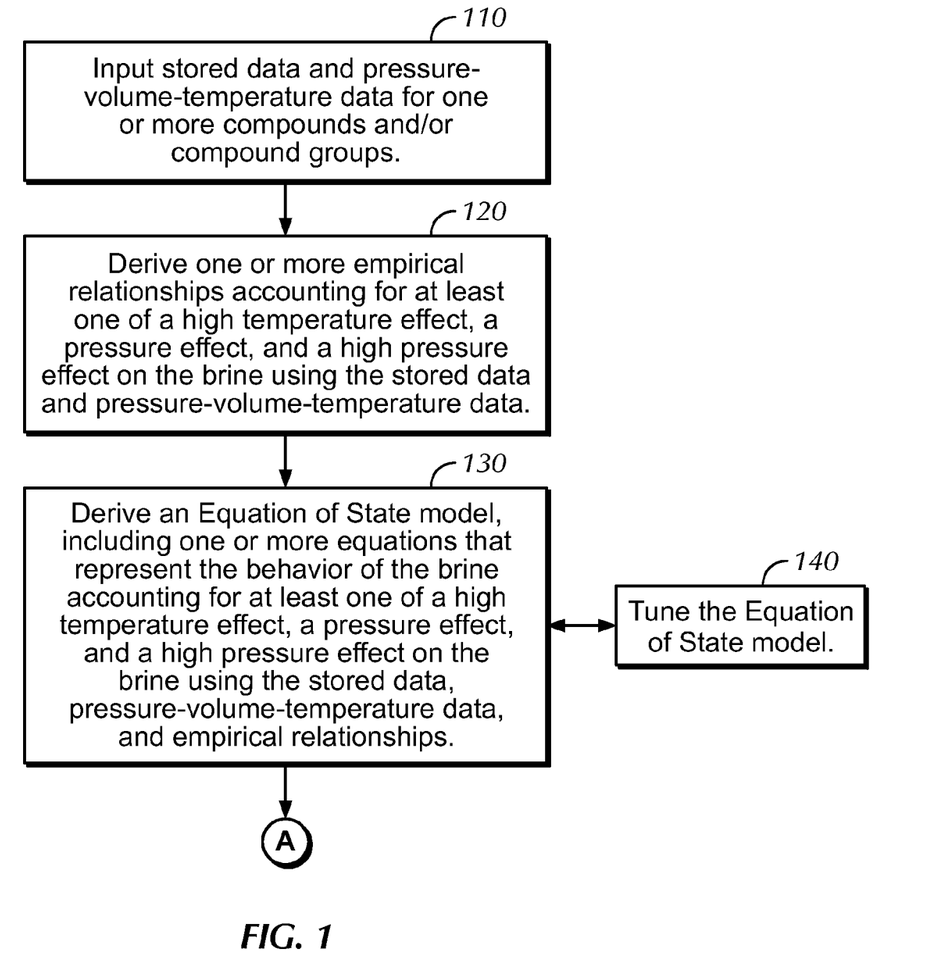
FIG. 1 is a flow chart for a method of developing an Equation of State model that accounts for a high temperature effect, a pressure effect, or a high pressure effect on a reservoir fluid according to embodiments disclosed herein.

Thus, embodiments disclosed herein include a method for generating a model to characterize a wellbore, where the model incorporates at least one of a temperature effect, a pressure effect, and a high pressure effect. Referring now to FIG. 1, a methodology to characterize a reservoir, reservoir fluid, or phase(s) of a reservoir fluid according to embodiments disclosed herein is illustrated. In step 110, stored data and pressure-volume-temperature data for one or more compounds and/or compound groups may be provided as an input. In step 120, the input stored data and pressure-volume-temperature data may be used to derive one or more empirical relationships accounting for at least one of a high temperature effect, a pressure effect, and a high pressure effect. In step 130, the stored data, pressure-volume-temperature data, and empirical relationships derived therefrom may be used to derive an Equation of State model including one or more equations that represent the behavior of the brine and account for at least one of a high temperature effect, a pressure effect, and a high pressure effect on the brine. The equations of the Equation of State model(s) may be self-derived, may be part of a commercially available software package, or may be a modification of equations provided in commercially available software packages.

Following derivation of the Equation of State, the Equation of State may optionally be tuned in step 140. Tuning of the Equation of State model may be performed by adjusting one or more of the input data, such as critical temperature or critical pressure, binary interaction parameters, volume translation parameters, and constants that may have been generated in deriving the empirical relationships, among others. Adjustment of the one or more variables may be performed for model validation, such as to properly characterize a known reservoir, or may be performed to better simulate or estimate characteristics of an unknown reservoir based on any downhole data that may be obtained during drilling or production of the well. As noted above, tuning may include adjusting various parameters to be a function of temperature or pressure or to have values pertaining to one or more discrete temperature or pressure ranges so as to account for the high temperature effect, pressure effect, and/or high pressure effect. Adjustment of the one or more constants that may have been generated in deriving the empirical relationships, such as the binary interaction parameters, and volume translation parameters, may be done to account for the effect of high temperature, pressure or high pressure on the constants.

Figure 2:
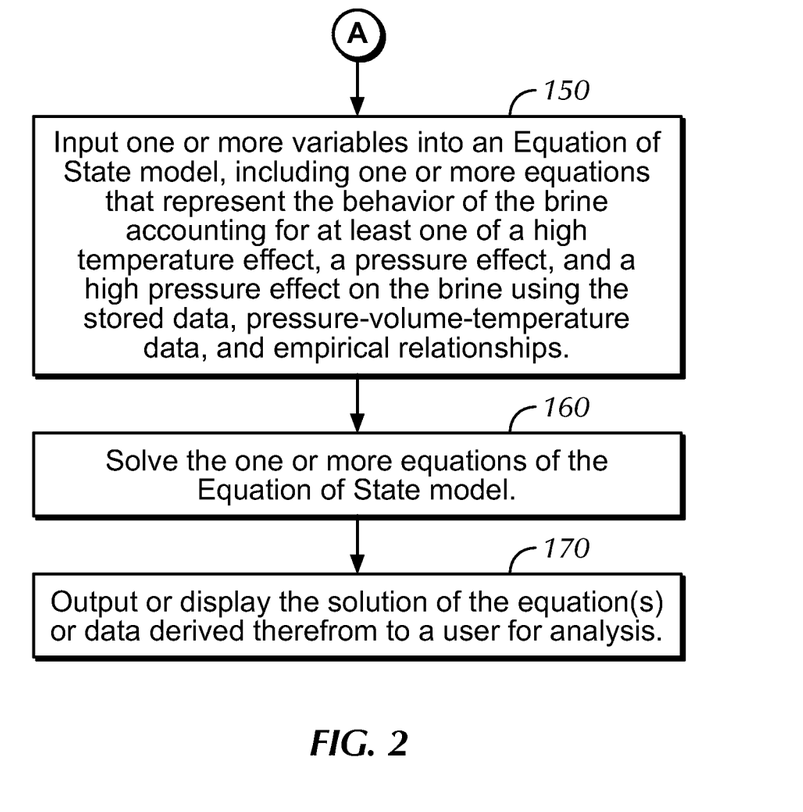
FIG. 2 is a flow chart for a method of characterizing or simulating a reservoir or reservoir fluid, using an Equation of State model that accounts for a high temperature effect, a pressure effect, or a high pressure effect on a reservoir fluid, according to embodiments disclosed herein.

Following derivation of the Equation of State model, as well as any validation or tuning that may be desired, the models may then be used to simulate or characterize a reservoir, reservoir fluid, or phase(s) of a reservoir fluid, as illustrated in FIG. 2. In step 150, one or more values/variables for at least one property of a reservoir, reservoir fluid, or phase(s) of a reservoir fluid may be input into the Equation of State model by a user, such as reservoir temperature, reservoir pressure, conductivity/resistivity, salinity brine properties such as ion/salt type(s), etc. The equations of the Equation of State model may then be solved, such as by a computer-implemented iteration scheme (e.g., Newton-Raphson iteration or other iteration schemes as known to those of skill in the art), in step 160, to determine or estimate one or more additional properties of the reservoir, reservoir fluid, or phase(s) of a reservoir fluid. The one or more properties determined or estimated may include properties such as brine content, hydrocarbon content, conductivity/resistivity of the brine, pressure-volume-temperature predictions, aqueous phase activity, density, viscosity, pH, free energy, heat capacity, entropy, enthalpy, phase compositions, chemical potentials, diffusion coefficients, as well as many other variables. In step 170, the solution of the equation(s) or data derived therefrom, such as charts or graphs, may then be output or displayed to a user for analysis. For example, the solution, charts, or graphs may be output to a display device, such as a monitor, or may be printed using a printer associated with the computer used to solve the equations of the Equation of State model.

Figure 3:
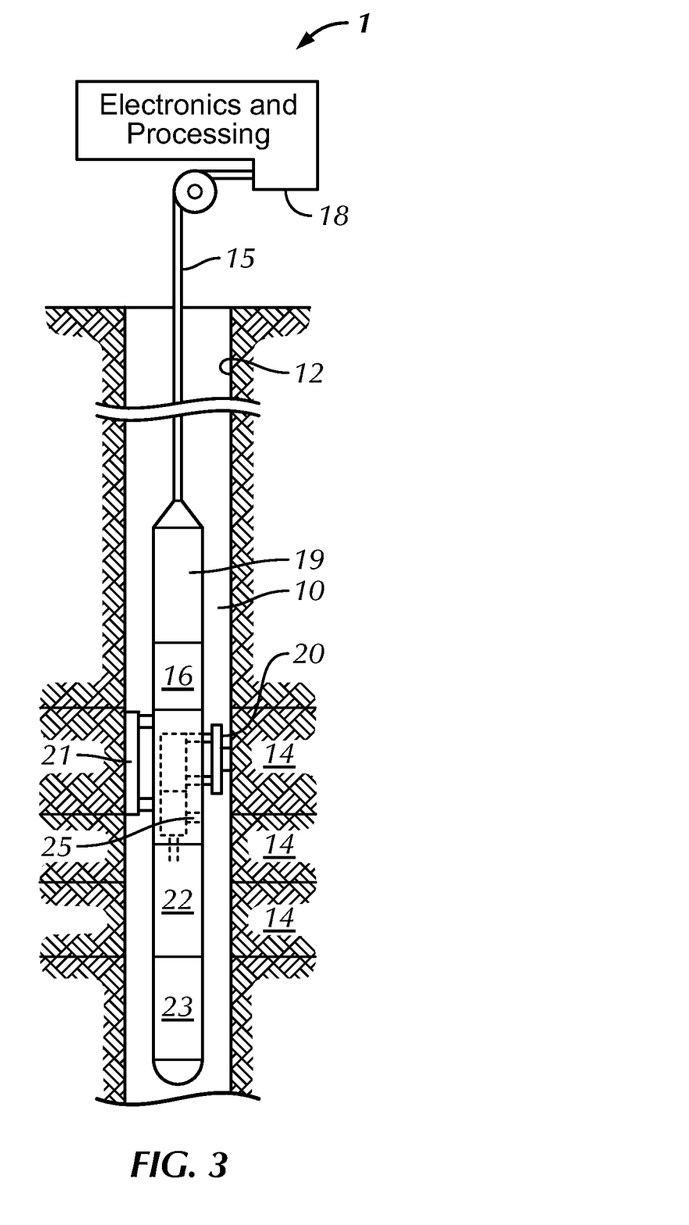
FIG. 3 illustrates a schematic diagram of a petroleum reservoir analysis system useful in characterizing or simulating a reservoir or reservoir fluid according to embodiments disclosed herein.

As noted above, following derivation of the Equation of State model, as well as any validation or tuning that may be desired, the models may then be used to simulate or characterize a reservoir, reservoir fluid, or phase(s) of a reservoir fluid, including characterization of reservoirs encountered during a drilling operation. For example, in some embodiments, a petroleum reservoir analysis system as shown in FIG. 3 may be used to obtain or infer at least one property of the reservoir, such as temperature, pressure, porosity, conductivity/resistivity, or other data that may be obtained or inferred during drilling or using a downhole analysis tool. The system 1 includes a borehole tool 10 suspended in the borehole 12 from the lower end of a typical multiconductor cable 15 that is spooled in a usual fashion on a suitable winch (not shown) on the formation surface. The cable 15 is electrically coupled to an electrical control system 18 on the formation surface. The tool 10 includes an elongated body 19 which encloses the downhole portion of the tool control system 16. The elongated body 19 also carries a selectively extendable fluid admitting assembly 20 and a selectively extendable tool anchoring member 21 which are respectively arranged on opposite sides of the tool body. The fluid admitting assembly 20 is equipped for selectively sealing off or isolating selected portions of the wall of the borehole 12 such that pressure or fluid communication with the adjacent geological formation 14 is established. The geological formation 14 may include various strata which may have various phases associated with them. In an embodiment, the geological formation may include an aqueous phase and a hydrocarbon phase. The aqueous phase is typically the brine within the geological formation. Also included with tool 10 may be means for determining the downhole pressure and temperature (not shown) and a fluid analysis module 25 through which the obtained fluid flows. The fluid may thereafter be expelled through a port (not shown) or it may be sent to one or more fluid collecting chambers 22 and 23 which may receive and retain the fluids obtained from the formation. Control of the fluid admitting assembly 20, the fluid analysis module 25, and the flow path to the collecting chambers is maintained by the control systems 16 and 18. As will be appreciated by those skilled in the art, the surface-located electrical control system 18 includes data processing functionality (e.g., one or more microprocessors, associated memory, and other hardware and/or software) to implement the invention as described herein. The electrical control system 18 can also be realized by a distributed data processing system wherein data measured by the tool 10 is communicated (preferably in real time) over a communication link (typically a satellite link) to a remote location for data analysis as described herein. The data analysis can be carried out on a workstation or other suitable data processing system (such as a computer cluster or computing grid).

An example of a borehole tool suitable for capturing fluid samples for data analysis is the Modular Dynamic Formation Tester (MDT) tool, available from Schlumberger Technology Corporation of Sugar Land, Tex., USA. The MDT tool provides a controlled channel of hydraulic communication between the reservoir fluid and the wellbore and allows withdrawal of small amounts of formation fluid through a probe that contacts the reservoir rock (formation). Such downhole fluid sampling is advantageous because the sampling is more accurate downhole. More specifically, in the event that the sampling pressure is above the saturation pressure, the fluid will be in a single phase ensuring that the original composition is being analyzed. For pressures below the saturation pressure, a measurement of the properties of the liquid phase in the oil zone and the associated gas above it will yield a more accurate sampling than a sample recombined at the surface. Indeed, it may be difficult to retain the sample in the state it exists downhole when it is retrieved to surface. Historically, fluid samples collected by well logging tools were brought to the surface for analysis in the laboratory. However, recent developments in the MDT tool have made possible the direct measurement of fluid properties downhole during the pump-out or sampling sequence, which is referred to herein as "downhole fluid analysis (DFA)." Details of the MDT tool and its capabilities for downhole fluid analysis may be obtained with reference to U.S. Pat. Nos. 3,859,851; 4,994,671; 5,167,149; 5,201,220; 5,266,800; and 5,331,156, all of which are incorporated herein by reference.

Downhole fluid analysis is advantageous because information is provided in real time, in contrast to a laboratory analysis that may require several days, or surface wellsite analysis that may result in undesirable phase transitions as well as the loss of key constituents. A detailed description of the fluid properties is desirable for an accurate modeling of the fluids in the reservoir. Indeed, decisions such as the type of well completion, production procedures, and the design of the surface handling and processing facilities are affected by the characteristics of the produced fluids.

Figure 4:
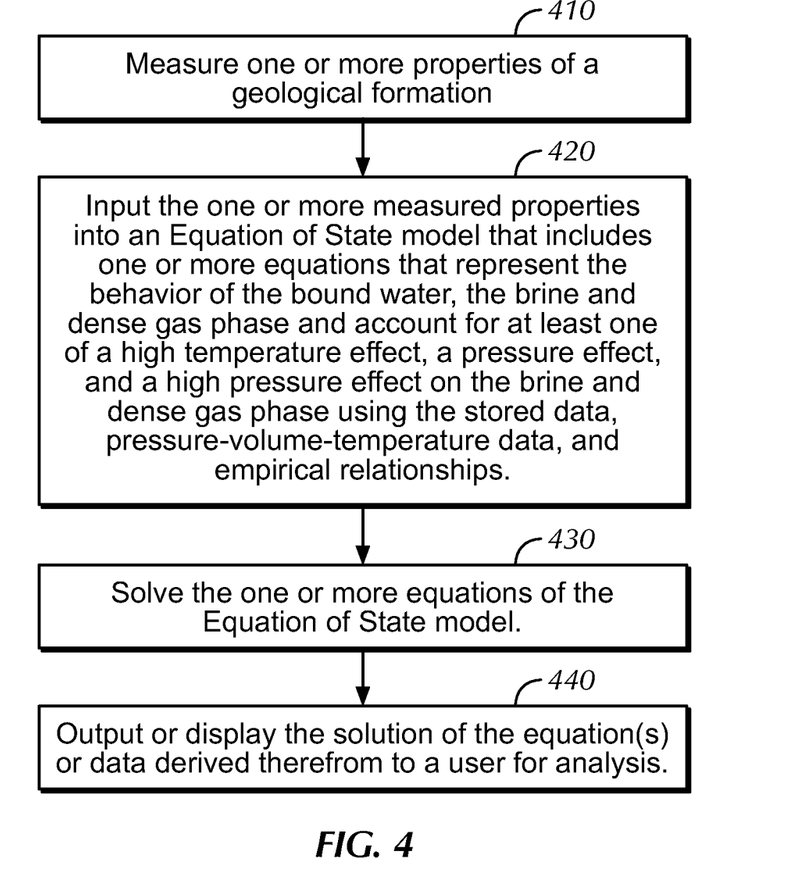
FIG. 4 is a flow chart for a method of characterizing or simulating a reservoir or reservoir fluid based on measurements made using the system of FIG. 3 (or other measurement devices or methods), using an Equation of State model that accounts for a high temperature effect, a pressure effect, or a high pressure effect on a reservoir fluid, according to embodiments disclosed herein.

The apparatus of FIG. 3 may be employed with the methodology of FIG. 4 to characterize, estimate, simulate, and/or analyze one or more properties of the geological formations encountered during drilling as a function of pressure and temperature, including one or more of a high temperature effect, a pressure effect, and a high pressure effect. For example, the measurements taken using the system of FIG. 3 may be used to characterize the compositional components, the fluid properties, or other aspects of a reservoir of interest.

The downhole tool measures at least one first property of the geological formation in step 410. The at least one first property may include, but is not limited to, the salinity of the reservoir fluid or a phase of the reservoir fluid, formation temperature and pressure, the types of ions present in the formation fluid or a phase of the formation fluid, the number of co-existing phases present (water/brine, hydrocarbon gases, hydrocarbon liquids), oil/water/gas ratios, and resistivity of the brine, among other measurable or quantifiable variables.

In step 420, the one or more measured properties may then be input into an Equation of State model that includes one or more equations that represent the behavior of the brine and account for at least one of a high temperature effect, a pressure effect and a high pressure effect on the brine. In step 430, the equations of the Equation of State may be solved, as described above, to determine at least one second property of the reservoir, reservoir fluid, or phase(s) of the reservoir fluid The at least one second property may be, but is not limited to, brine content, hydrocarbon content, resistivity of the brine, phase activity, phase fugacity, density, viscosity, pH, free energy, heat capacity, entropy, enthalpy, phase compositions, chemical potentials, and diffusion coefficients as well as many other variables. The at least one second property may also include, but is not limited to, salinity, formation temperature and pressure, types of ions present, and the number of coexisting phases present.

In step 440, the solution of the equation(s) or data derived therefrom, such as charts or graphs, may then be output or displayed to a user for analysis. For example, the solution, charts, or graphs may be output to a display device, such as a monitor, or may be printed using a printer associated with the computer used to solve the equations of the Equation of State model.

In other embodiments, data input (stored data or PVT data) in embodiments disclosed herein may be generated using a high pressure high temperature testing apparatus. For example, a test apparatus including a view cell may be used to investigate, measure, or observe phase behavior of salts or other ions in brines and dense gases (including methane, $H_2S$, $CO_2$, etc. as described above) at extreme temperatures and/or pressures, as well as the phase behavior of mixtures of brine, dense gases, and/or heavier hydrocarbons (VLLE, SVLLE, etc.). Such laboratory testing apparatus may be used to measure the effects of high temperature and pressure on the brine and dense gas phases, providing data input to the model for deriving the high temperature, pressure, and/or high pressure effects, or may be used to estimate various parameters (binary interaction parameters, etc.) or to determine how such parameters may be modified to account for the high temperature, pressure, and/or high pressure effects.

In the manner described above, the character of a reservoir or reservoir fluid may be determined, estimated, or simulated, accounting for one or more of a high temperature effect on the brine, a pressure effect on the brine, and a high pressure effect on the brine. Determination of the character of the wellbore may provide valuable data with respect to hydrocarbon reserves (gas and/or oil), viability for producing a reservoir (i.e., fluid-containing strata) encountered during drilling, as well as to simulate production conditions that may allow an optimal recovery of hydrocarbons from the reservoir.

EXAMPLE

Figure 5:
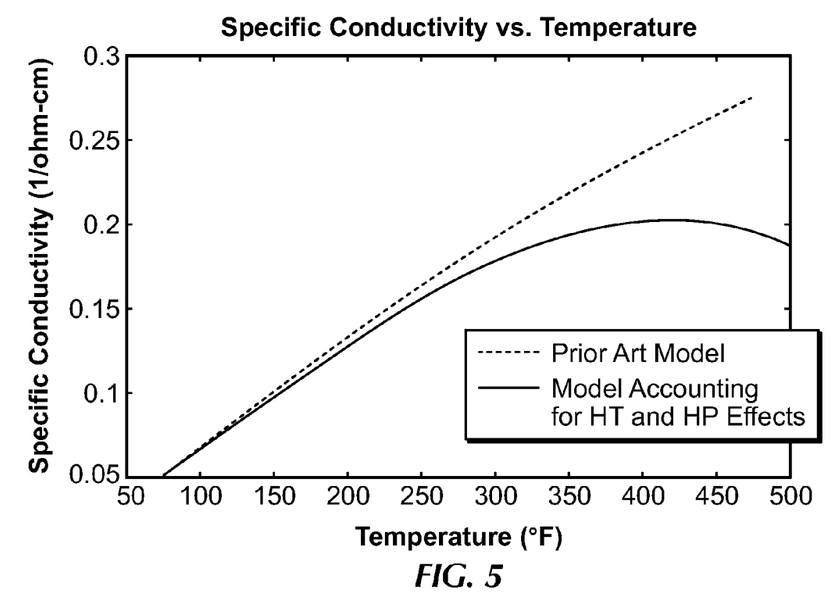
FIGS. 5 and 6 graphically compare conductivity as a function of temperature for an Equation of State model according to embodiments disclosed herein accounting for a high temperature effect, a pressure effect, or a high pressure effect on a reservoir fluid, with a prior art model that does not account for any of a high temperature effect, a pressure effect, or a high pressure effect on a reservoir fluid.
Figure 6:
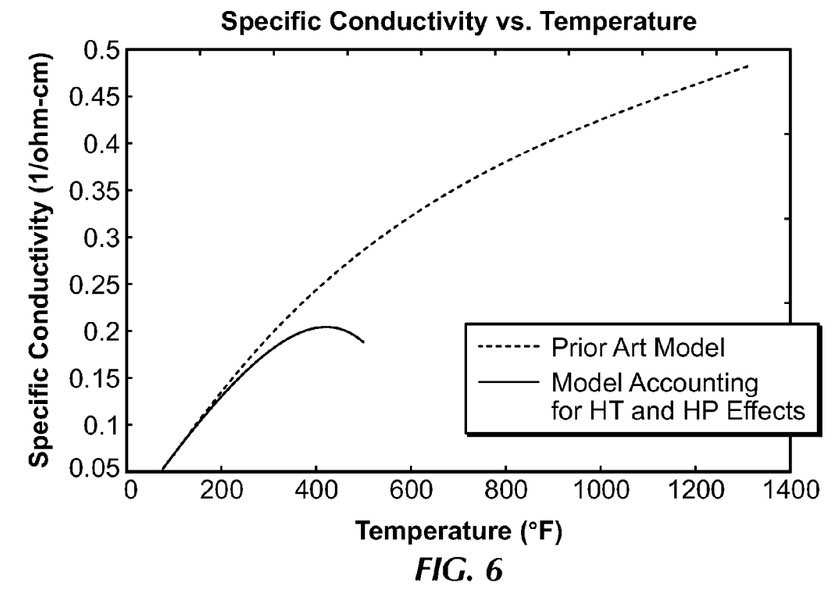

FIGS. 5 and 6 graphically compare conductivity as a function of temperature for an Equation of State model according to embodiments disclosed herein accounting for a high temperature effect, a pressure effect, and a high pressure effect on a reservoir fluid, with a prior art model that does not account for any of a high temperature effect, a pressure effect, or a high pressure effect on a reservoir fluid. The prior art model does not correctly predict the resistivity/conductivity of the brine solutions at higher temperatures and pressures. Accounting for electrophoretic/relaxation effects and ion pairing at high temperatures, as well as effects from solvated ions/components and dissolves gasses/solids, differences on the order of 5% to 30% in conductivity are observed. Such large differences could lead to incorrect interpretation of the well data, and may potentially affect measurements in thin beds and formations with higher water cut (rocks with low hydrocarbon saturation). In other words, by accounting for a high temperature effect, pressure effect, and/or high pressure effect, it may be possible to more accurately predict hydrocarbon content of the formations encountered during drilling, as well as to more efficiently produce said formations.

As described above, embodiments disclosed herein account for one or more of a high temperature effect, a pressure effect, and a high pressure effect on the simulated or estimated properties of brines encountered in reservoirs. By accounting for such effects, embodiments disclosed herein may allow more accurate characterization of reservoirs, reservoir fluids, or phase(s) or reservoir fluids, more accurately predict hydrocarbon content of the formations encountered during drilling, and allow for extension of such simulations to provide for an increase in efficiency for production of reservoirs of interest.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for characterizing one or more properties of a geological formation, the method comprising:
in an electrical control system, inputting at least one first property of the geological formation into an equation of state (EOS) model accounting for a high pressure effect on a reservoir fluid that results in changes in one or more properties of the reservoir fluid as a function of pressure that include deviations from an ideal behavior;
wherein the EOS model uses a first equation for the one or more properties, when the pressure is less than a threshold pressure at which the high pressure effect is present;
wherein the EOS model uses a second equation different from the first equation for the one or more properties, when the pressure is at least the threshold pressure;
in the electrical control system, using the at least one first property to solve the EOS model to determine at least one second property of the geological formation;
outputting the at least one second property to a display device.

2. The method of claim 1, wherein the changes in the one or more properties comprise a change in at least one of solubility characteristic, density, di electric constant, electronegativity, dipole moment, heat capacity, hydrogen bonding, miscibility, electrophoretic and/or relaxation effect, ion pairing, or some combination thereof.

3. The method of claim 1, wherein the threshold pressure is at least 15 ksi.

4. The method of claim 1, wherein the EOS model comprises a thermodynamic model.

5. The method of claim 1, wherein the reservoir fluid comprises at least one of an aqueous phase, a hydrocarbon gas phase, or a hydrocarbon liquid phase.

6. The method of claim 1, wherein the EOS model also accounts for a high temperature effect on the reservoir fluid.

7. The method of claim 6, wherein the high temperature effect comprises an elevated temperature of greater than 300 degrees F.

8. The method of claim 1, wherein the at least one first property comprises at least one of reservoir temperature, reservoir pressure, conductivity/resistivity, salinity, number of co-existing phases present, oil/water/gas ratios, and ion/salt type.

9. The method of claim 1, wherein the at least one second property comprises at least one of brine content, hydrocarbon content, conductivity/resistivity of the brine, pressure-volume-temperature predictions, phase fugacity, aqueous phase activity, density, viscosity, pH, free energy, heat capacity, entropy, enthalpy, phase compositions, chemical potentials, diffusion coefficients, salinity, formation temperature and pressure, types of ions present, or the number of coexisting phases present.

10. The method of claim 1, comprising generating the EOS model in the electrical control system by:
inputting stored data and pressure-volume-temperature (PVT) data for one or more compounds;
deriving one or more empirical relationships accounting for the high pressure effect on the reservoir based on the stored data and the PVT data; and
deriving the EOS model including the first and second equations using the stored data, the PVT data, and the one or more empirical relationships.

11. The method of claim 10, further comprising tuning the EOS model.

12. The method of claim 11, wherein tuning the EOS model comprises adjusting one or more parameters of at least one of the stored data or the PVT data used to derive the one or more empirical relationships.

13. The method of claim 12, wherein the one or more parameters comprises a critical temperature, a critical pressure, a binary interaction parameter, or a volume translation parameter.

14. The method of claim 1, wherein the EOS model is based upon at least one of the Sen-Good-Sibbit EOS, the Redlich-Kwong EOS, the Soave-Redlich-Kwong EOS, or the Peng Robinson EOS.

15. The method of claim 1, wherein the reservoir fluid comprises a brine; and wherein the EOS model accounts for a high pressure effect of at least 15 ksi on the one or more properties of the geological formation.

16. The method of claim 15, wherein the high pressure effect on the brine in the EOS model accounts for changes in the one or more properties of the brine as a function of pressure.

17. The method of claim 16, wherein the one or more properties of the brine include a conductivity, a resistivity, a density, a viscosity, a compressibility, a hydrogen content, a salinity, a pH, free energy, a heat capacity, a entropy, a enthalpy, phase compositions, chemical potentials, diffusion coefficients, or a combination thereof.

18. A method for characterizing one or more properties of a geological formation including brine, the method comprising:

in an electrical control system, inputting at least one first property of the geological formation into an equation of state (EOS) model accounting for a high pressure effect on the brine that results in changes of one or more properties of the brine as a function of pressure that include deviations from ideal behavior that may be estimated, measured, or observed at elevated downhole pressures;

wherein the EOS model uses a first equation for the one or more properties, when the pressure is less than 15 ksi;

wherein the EOS model uses a second equation different from the first equation for the one or more properties, when the pressure is at least 15 ksi;

in the electrical control system, using the at least one first property to solve the EOS model to determine at least one second property of the geological formation; and outputting the at least one second property to a display device.

19. The method of claim 18, wherein the EOS model also accounts for a temperature effect on the brine.

* * * * *